(12) United States Patent
Dicke

(10) Patent No.: US 8,471,765 B2
(45) Date of Patent: Jun. 25, 2013

(54) METHOD AND DEVICE TO DETERMINE OUT OF COVERAGE FOR MOBILE DEVICES

(75) Inventor: Ronald Anthony Dicke, Ottawa (CA)

(73) Assignee: Research In Motion Limited, Waterloo, Ontario (CA)

( * ) Notice: Subject to any disclaimer, the term of this patent is extended or adjusted under 35 U.S.C. 154(b) by 0 days.

(21) Appl. No.: 13/274,433

(22) Filed: Oct. 17, 2011

(65) Prior Publication Data

US 2012/0032845 A1    Feb. 9, 2012

Related U.S. Application Data

(63) Continuation of application No. 12/432,144, filed on Apr. 29, 2009, now Pat. No. 8,040,277.

(51) Int. Cl.
*G01S 19/34* (2010.01)

(52) U.S. Cl.
USPC ..................................... 342/357.74

(58) Field of Classification Search
USPC ..................................... 342/357.74
See application file for complete search history.

(56) References Cited

U.S. PATENT DOCUMENTS

| 6,141,570 | A | 10/2000 | O'Neill, Jr. et al. |
| 6,438,381 | B1 | 8/2002 | Alberth et al. |
| 6,662,107 | B2 * | 12/2003 | Gronemeyer ................. 701/478 |
| 7,421,276 | B2 | 9/2008 | Steer et al. |
| 2006/0114151 | A1 | 6/2006 | Iwami |
| 2008/0032677 | A1 * | 2/2008 | Catovic et al. ............. 455/414.1 |
| 2008/0108374 | A1 | 5/2008 | Xiong et al. |
| 2009/0098880 | A1 | 4/2009 | Lindquist |
| 2009/0171561 | A1 * | 7/2009 | Geelen .......................... 701/201 |

OTHER PUBLICATIONS

Extended European Search Report dated Oct. 21, 2009 from corresponding European Patent Application No. 09159127.1, 5 pages.
Mike [AT], Open GPS Tracker: How it works and how to modify it; p. 1 to 5 of 5; printed on Apr. 29, 2009; http://www.electronics-lab.com/projects/robotics/003/howitworks.html.
Mike [AT], Commands for build 0.17; p. 1 to 4 of 4; printed on Apr. 29, 2009; http://www.electronics-lab.com/projects/robotics/003/commands.html.

* cited by examiner

*Primary Examiner* — Harry Liu

(57) ABSTRACT

A method and a mobile device configured to obtain position information from a position broadcast system, the position broadcast system comprising a plurality of transmitters that each broadcast a respective signal containing position information for the respective transmitter. The method comprising: measuring signal strengths of signals from a plurality of the transmitters of the position broadcast system; and determining that the mobile device is out of range of the position broadcast system if the measured signals strengths satisfy at least one out of range criterion.

14 Claims, 4 Drawing Sheets

US 8,471,765 B2

METHOD AND DEVICE TO DETERMINE OUT OF COVERAGE FOR MOBILE DEVICES

RELATED APPLICATION

This application is a continuation of application Ser. No. 12/432,144 filed Apr. 29, 2009, the entire disclosure of which is incorporated by reference in its entirety.

TECHNICAL FIELD

This application is related to a method and device for determining if a mobile device is out of range of a position broadcast system.

BACKGROUND

Position broadcast systems, either terrestrial or satellite based, are used to provide location information to user devices. Examples of such systems include: GPS (Global Positioning System), GLONAS, Galileo, and WAAS or extended GPS.

Some mobile devices are now being made with the ability to obtain position or location information from such systems. For example, many mobile devices have GPS receivers. Applications on such mobile devices or on servers supporting the mobile devices can integrate the position information obtained. For example, a mapping application may use the information to display a map showing a mobile device's current position.

GPS uses a plurality of satellites, presently approximately 30. Devices with GPS receivers can typically see 12 to 16 satellites at any one time. A device needs to be able to see or receive signals from at least three satellites to lock on to a position. To calculate latitude, longitude and altitude, signals from at least four satellites are required. Each satellite continuously broadcasts messages, in the form of packets, containing an identifier, timing signature, ephemeris data and almanac data. Almanac data indicates where in the sky the satellite is located. Ephemeris data contains information to account for distortions in the position and time data.

Strength of signals from GPS satellites at a GPS receiver's location will depend on many factors, such as where in the sky the respective satellite is located, obstacles blocking the signal and atmospheric conditions. Signals from GPS satellites are difficult to receive while the GPS receiver is inside a building because the structure of the building blocks or distorts the signals. Often, when a GPS receiver enters a building it is no longer able to lock onto a position. Sometimes, if the GPS receiver has a lock and it enters a building a lock can be maintained, if only temporarily. However, if the lock is lost, for example, if the device enters an elevator, then it is difficult or impossible to obtain a lock again within the building.

GPS receivers' power consumption is at its highest when searching for satellites for the purpose of locking on to a position. Some user devices have procedures for a cold start, a warm start and a hot start. For a cold start, a user device will instruct its GPS receiver to search for every satellite in the sky. For a warm start, the user device will instruct the GPS receiver to search for satellites from a narrower range of satellites based on the user devices last known position. A hot start, an even narrower range is used. For a cold start uses more power than a warm start or a hot start.

Many devices with GPS receivers will continue to search for satellites when the device is out of range of those signals, for example inside a building. Continuously searching for satellites is very power intensive and can have a dramatic effect on length of time a battery in a mobile device maintains its charge.

BRIEF DESCRIPTION OF THE DRAWINGS

Examples of embodiments will now be described in greater detail with reference to the accompanying drawings, in which.

DETAILED DESCRIPTION

Figure 1A:
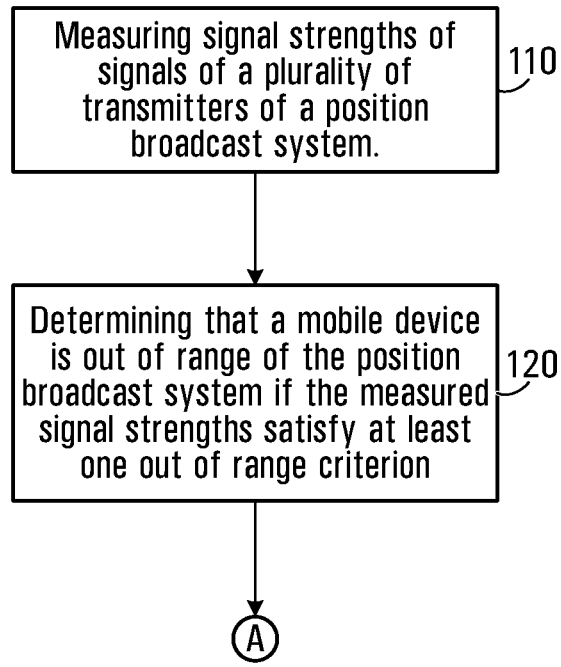
FIG. 1 is a flowchart of a method for determining if a mobile device is out of range of a position broadcast system.

Trying to lock onto GPS satellites when a GPS receiver is clearly out of coverage, for example inside a building, can be futile and it consumes a lot of battery power. In aspects of a method described herein, attempts to lock onto satellites are limited by defining an out of range criterion, that if met means the GPS receiver can be deemed out of range or coverage.

The GPS receivers on mobile devices have high level APIs (Application Programming Interfaces) that may request location of the mobile device which forces the GPS receiver to search for satellites. This is both time consuming and requires a lot of power and can result in draining the battery. If this is attempted continually while the mobile device is inside a building, where the signals can not be received, the battery of the mobile device will be drained more quickly.

Accordingly, in one aspect, there is provided a method, in a mobile device configured to obtain position information from a position broadcast system, the position broadcast system comprising a plurality of transmitters that each broadcast a respective signal containing position information for the respective transmitter, the method comprising: measuring signal strengths of signals from a plurality of the transmitters of the position broadcast system; and determining that the mobile device is out of range of the position broadcast system if the measured signals strengths satisfy at least one out of range criterion.

In another aspect, there is provided a mobile device comprising: a receiver for measuring signal strengths of signals from a plurality of transmitters of a position broadcast system; an out of range determination module configured to determine that the mobile device is out of range of the position broadcast system if the measured signals strengths satisfy at least one out of range criterion.

In another aspect, there is provided one or more tangible computer readable media having computer readable instructions stored thereon that when executed implement a method for determining if a mobile device is out of range of a position broadcast system, the position broadcast system comprising a plurality of transmitters that each broadcast signals containing position information for the respective transmitter, the method comprising: measuring signal strengths of signals from a plurality of the transmitters of the position broadcast system; and determining that the mobile device is out of range of the position broadcast system if the measured signals strengths satisfy at least one out of range criterion.

In an embodiment, a GPS receiver on a mobile device monitors the signal strengths of signals received from GPS satellites to determine if the mobile device is out of range of the GPS satellites. In general, if the signal strengths of a predetermined number of GPS satellites are below a certain threshold then the GPS device can be deemed to be out of coverage. Or, put another way, if the signal strengths of at least a predetermined number of GPS satellites are above a certain threshold value, then the GPS device can be deemed to be within coverage, this is very different from the scenario where many satellites may be in view but the GPS receiver has yet to calculate a lock either due to insufficient satellites or not enough signal strength to obtain a lock. Embodiments of the present application use a threshold difference between unlocked and still searching and no signal available. Once the GPS device is deemed to be out of coverage range of the satellites, an option is to stop searching for satellite signals for a predetermined period of time, which results in conservation of power.

An exemplary method of determining if a mobile device is out of range of a position broadcast system will now be described with reference to FIG. 1.

The method is executed in a mobile device configured to obtain position information from a position broadcast system. The position broadcast system comprises a plurality of transmitters that each broadcast a respective signal containing position information for the respective transmitter. The method starts at step 110 with measuring signal strengths of signals from a plurality of the transmitters of the position broadcast system. In some embodiments, the method comprises measuring signal strengths of a plurality of signals from satellites of a Global Positioning System (GPS). In some embodiments, the method comprises measuring the signal strength of signals from each visible satellite. In some embodiments, the transmitters are RF (Radio Frequency) towers and the method comprises measuring the signal strength of each visible RF tower. In some embodiments, a receiver in the mobile device tries to extract a valid signal from incoming RF. As noise is introduced into the signal, the receiver attempts to extract a signal from the incoming signal. The signal strength to noise strength (otherwise known as signal to noise ratio) must be large enough for the receiver to succeed at this. Receiver specifications specify the required signal to noise ratio to successfully extract the signal for a particular receiver.

Measuring signal strengths, in some embodiments, comprises averaging a plurality of measurements for each signal. In other embodiments, only one measurement is taken per signal.

At step 120, the method continues with determining that the mobile device is out of range of the position broadcast system if the measured signals strengths satisfy at least one out of range criterion. The out of range criterion or criteria define limits of signals strengths within which the mobile device is deemed to be out of range of the position broadcast system. In some embodiments an out of range signature is defined.

In some embodiments, determining that the mobile device is out of range comprises determining that fewer than a predetermined number of the measured signal strengths are above a threshold value. In some embodiments, determining that the mobile device is out of range comprises determining that the sum of a predetermined number of the measured signal strengths of each of the plurality of the transmitters is below a threshold value. In some embodiments, determining that the mobile device is out of range comprises determining that the signal strength from each operational transmitter is below a threshold value. In some embodiments, determining that the mobile device is out of range comprises determining that the signal strength of fewer than a predetermined number of visible transmitters is above a threshold value.

The next step 130 is determining that the mobile device is out of range if the measured signals strengths are within the out of range signature.

In some embodiments, the method further comprises turning off a position broadcast receiver in the mobile device for a predetermined period of time if the mobile device is determined to be out of range. In some embodiments, the method further comprising attempting to obtain position information from the position broadcast system after a predetermined period of time after the mobile device is determined to be out of range has expired. For example, a GPS receiver can be turned off or put into an out of range mode, in which attempts to lock onto a position are ceased temporarily.

After the GPS receiver has been turned off or put into out of range mode temporarily, in some embodiments, the GPS receiver will be triggered to attempt to lock into a position after a predetermined period of time. The GPS receiver will then attempt to lock onto a position using either hot start, warm start or cold start. A GPS receiver will attempt to use any information is has available to try and find the satellites. In some embodiments, the GPS receiver uses the last time it was successfully locked onto the satellites to determine whether to try a hot, warm, or cold start. So for example, if the attempt to lock on was made within an hour the GPS receiver will attempt a hot start (or if the receiver has received updated ephemeris data). If the last attempt to lock on was between 1 and 24 hours, the GPS receiver will probably attempt a warm start if it had previous information. Over 24 hours or if it has never had a successful lock, the GPS receiver will cold start. Of course, these are examples only and each receiver can be configured to use hot, warm or cold start based on any criteria.

Figure 1B:
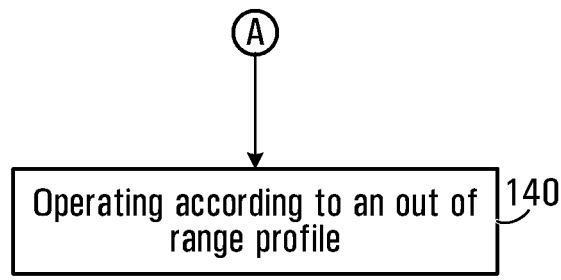

An exemplary embodiment of the method will now be described with reference to FIG. 1B. The method of this embodiment includes all of the steps of the embodiments described with reference to FIG. 1A and further comprises operating the mobile device according to an out of range profile for a predetermined period of time if the mobile device is determined to be out of range (step 140). Non-limiting examples of operating according to an out of range profile, include turning off a GPS receiver for a predetermined period of time, instructing all applications that rely on location information to use the last position received, displaying an indication on a user interface of the mobile device that the device is out of range.

In some embodiments, the method further comprises indicating with a user interface that the mobile device is out of range if the mobile device is determined to be out of range. Non-limiting examples include: displaying an icon on a display screen; outputting an audible signal to a speaker; and sending a text message to a display screen or an email address.

In still further embodiments, the method, further comprises presenting an option on a user interface to attempt to obtain position information if the mobile device is determined to be out of range; and in response to receiving an input from the user interface not to attempt to obtain position information, instructing a position broadcast receiver in the mobile device not to obtain position information. In some embodiments, the method further comprises presenting an option on the user interface to attempt to obtain position information after a period of time; and in response to receiving an input from the user interface to attempt to obtain position information, instructing the position broadcast receiver to obtain position information.

In other embodiments, an option to operate in an out of range mode for the predetermined period of time is presented.

In some embodiments, an option is presented on the user interface to define the predetermined period of time.

Many location based applications on mobile devices require the location of the mobile device on a perpetual basis. As people spend a good portion of their days indoors, and most indoor places block GPS signals, the methods described herein can be used to limit the amount of time used by the mobile device to attempt to find a GPS signal. If after a predetermined time the GPS signals received by a GPS receiver are below the threshold or within an out of range signature, then the GPS receiver can be shut down and an attempt can be made later, as opposed to continually trying for a lengthy period and draining the battery.

The methods described herein are applicable to other position broadcast systems as well. The signal strength of at least one transmitter in a position broadcast system that transmits information used to calculate position can be used as a basis for determining if a user device is out of coverage range of the at least one transmitter or of the system.

In some embodiments, a determination that the user device is out of coverage range is made if the signal strengths from fewer than a predetermined number of the transmitters are above a threshold. In other embodiments the determination is made if the signal strengths of all operational transmitting elements are below a threshold. In other embodiments the determination is made if the signal strengths of a predetermined number of transmitters match a signature for out of coverage range. In other embodiments, the determination is made if the signal strengths of a predetermined top number of transmitters are below a threshold. In other embodiments the determination is made if the sum of the signal strengths for a predetermined top number of transmitters is below a threshold. In some embodiments the signals strengths from one measurement per transmitter is used. In other embodiments, each signal strength is determined based on a number of measurements taken over a predetermined period of time. In some embodiments the measurements taken over the predetermined period of time are averaged and the average is compared to a threshold.

In exemplary embodiments of mobile devices having GPS receivers, firmware in the mobile devices controls a chip comprising the GPS receiver. The methods described herein can be implemented by such firmware. In other embodiments, the chip comprising GPS receiver can be configured to perform the method. In still other embodiments, a processor executes computer-executable instructions stored on a tangible computer-readable medium for implementing a method described herein.

Figure 2:
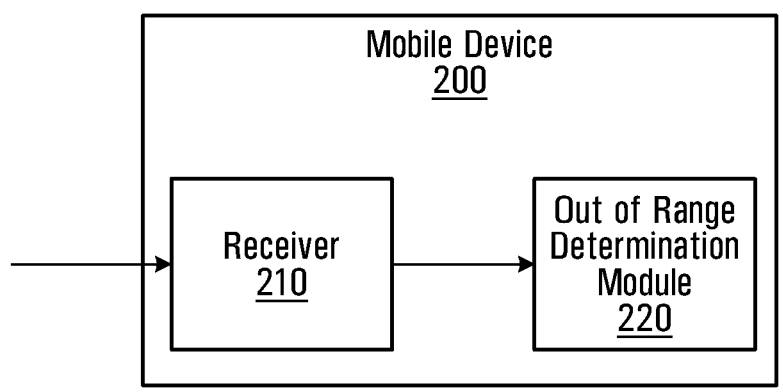
FIG. 2 is a flowchart of a method for determining if a mobile device is out of range of a position broadcast system.

An exemplary mobile device will now be described with reference to FIG. 2. A mobile device 200 comprises a receiver 210 and an out of range determination module 220. The receiver 210 measures signal strengths of signals from a plurality of transmitters of a position broadcast system. The out of range determination module is configured to determine that the mobile device is out of range of the position broadcast system if the measured signals strengths satisfy at least one out of range criterion.

Some embodiments of the mobile device further comprise a user interface for presenting an option to instruct the mobile device not to attempt to obtain position information if the mobile device is determined to be out of range. In other embodiments, the user interface is used to present an option to turn off a GPS receiver for a predetermined period of time if the mobile device is determined to be out of range.

In some embodiments of the mobile device 200, the receiver is a Global Positioning System (GPS) receiver. In some embodiments, the transmitters are GPS satellites.

The out of range determination module 220 in some embodiments, is implemented by firmware for controlling a GPS chipset. In other embodiments, the out of range determination module is implemented by a GPS chipset. In other embodiments, the module 220 is implemented as one or more tangible computer readable media having computer-executable instructions stored thereon for implementing the module.

Figure 3:
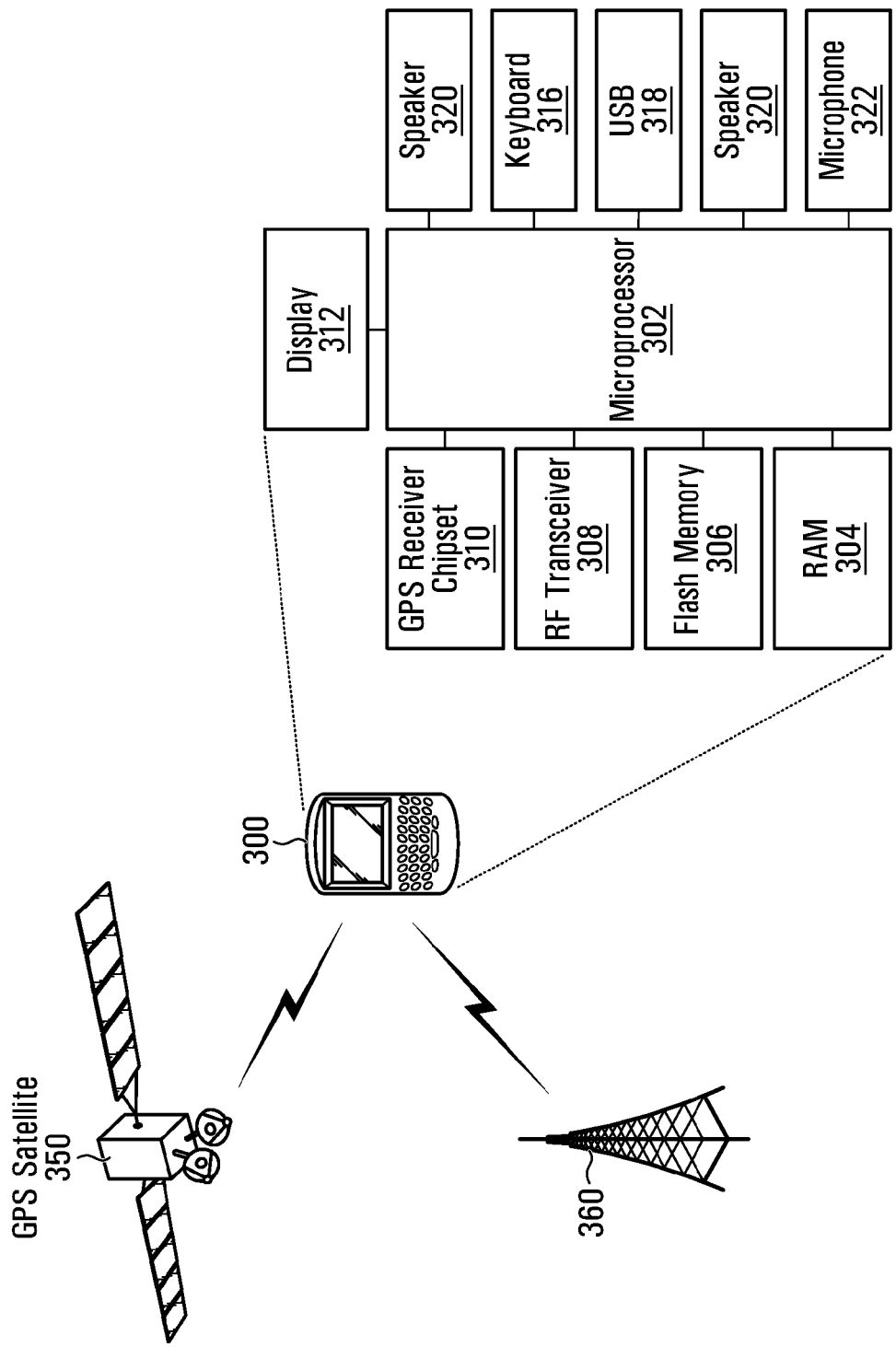
FIG. 3 is a block diagram of a mobile device according to one aspect.

FIG. 3 is a block diagram depicting certain key components of an exemplary mobile device 300. It should be expressly understood that this figures is intentionally simplified to show only certain components; the mobile device 300 of course includes other components beyond what are shown in FIG. 3. The mobile device 300 includes a microprocessor 302 (or simply a "processor") which interacts with memory in the form of RAM 304 and flash memory 306. The processor 302 can implement the methods described herein for determining if the mobile device 300 is out of range. The mobile device 300 includes an RF transceiver 308 for communicating wirelessly with one or more base stations 360. The mobile device 300 includes a GPS receiver chipset 310 for receiving GPS radio signals transmitted from one or more orbiting GPS satellites 350. In terms of input/output devices or user interfaces, the mobile device 300 includes a display 312 (e.g. a small LCD screen), a thumbwheel and/or trackball 314, a keyboard 316, a USB 318 or serial port for connecting to peripheral equipment, a speaker 320 and a microphone 322. The processor 302 and memory 304 thus enable (among other software applications) a communication application such as an e-mail application and/or an instant messenger to run on the mobile device. The communication application(s) interact with the GPS receiver 310 (GPS chipset) by receiving GPS position data either directly or indirectly from a GPS chipset manager application that executes on the mobile device 300 for managing the GPS receiver hardware and for (optionally) storing recent GPS position data from recent GPS fixes. An application to determine if the mobile device 300 is out of range of the GPS satellites 350 can also be run on the mobile device 300.

The methods described herein are implemented, in some embodiments, by one or more tangible computer readable media having computer readable instructions stored thereon that when executed implement the respective method.

Figure 4:
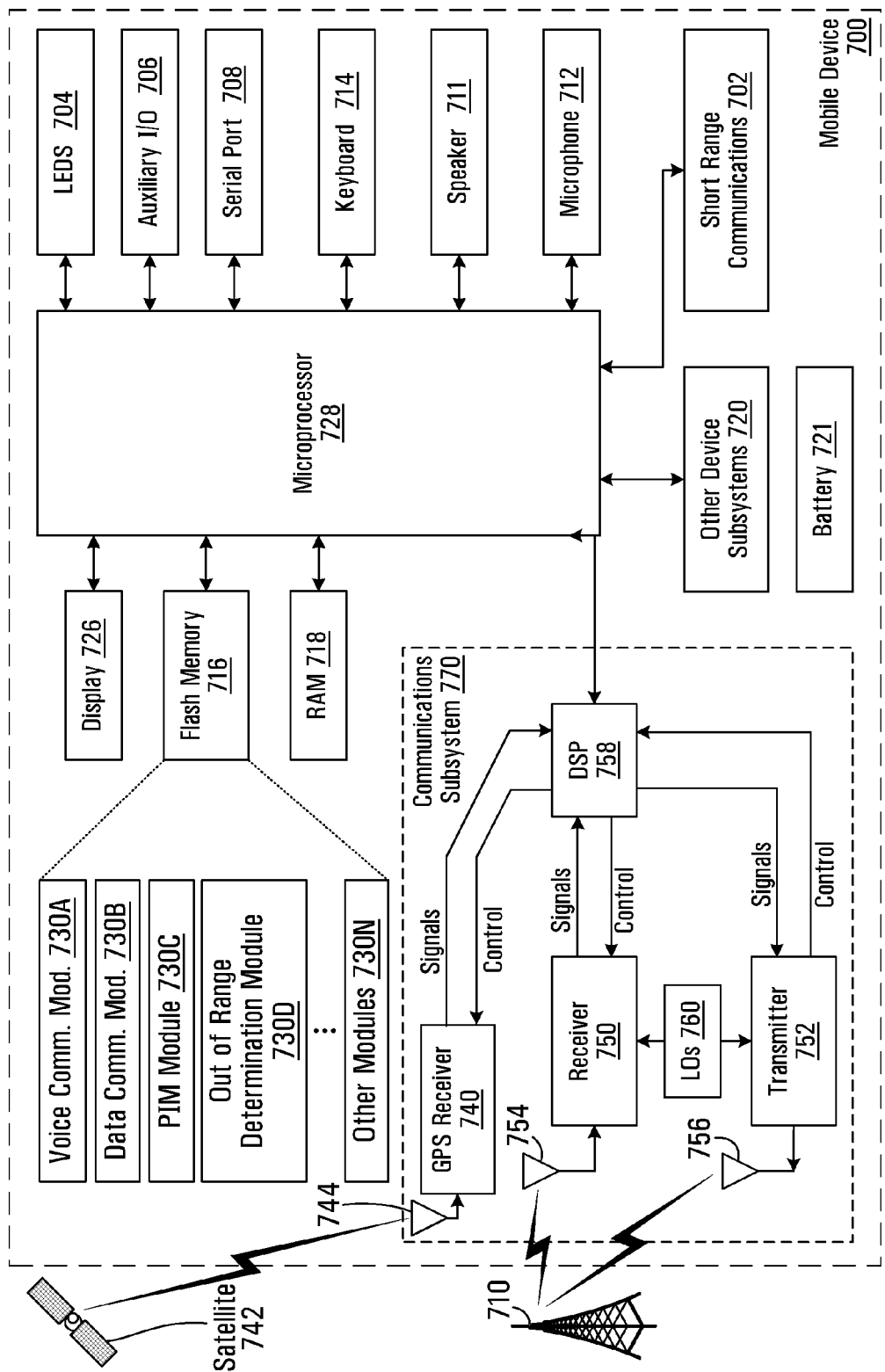
FIG. 4 is a block diagram of a mobile device on which the methods described herein may be executed.

Referring now to FIG. 4, shown is a block diagram of another mobile device 700 that may implement any of the methods described herein. It is to be understood that the mobile device 700 is shown with very specific details for example purposes only.

A processing device (a microprocessor 728) is shown schematically as coupled between a keyboard 714 and a display 726. The microprocessor 728 controls operation of the display 726, as well as overall operation of the mobile device 700, in response to actuation of keys on the keyboard 714 by a user.

The mobile device 700 has a housing that may be elongated vertically, or may take on other sizes and shapes (including clamshell housing structures). The keyboard 714 may include a mode selection key, or other hardware or software for switching between text entry and telephony entry.

In addition to the microprocessor 728, other parts of the mobile device 700 are shown schematically. These include: a communications subsystem 770; a short-range communications subsystem 702; the keyboard 714 and the display 726, along with other input/output devices including a set of LEDS 704, a set of auxiliary I/O devices 706, a serial port 708, a speaker 711 and a microphone 712; as well as memory devices including a flash memory 716 and a Random Access Memory (RAM) 718; and various other device subsystems 720. The mobile device 700 may have a battery 721 to power the active elements of the mobile device 700. The mobile device 700 is in some embodiments a two-way radio frequency (RF) communication device having voice and data communication capabilities. In addition, the mobile device 700 in some embodiments has the capability to communicate with other computer systems via the Internet.

Operating system software executed by the microprocessor 728 is in some embodiments stored in a persistent store, such as the flash memory 716, but may be stored in other types of memory devices, such as a read only memory (ROM) or similar storage element. In addition, system software, specific device applications, or parts thereof, may be temporarily loaded into a volatile store, such as the RAM 718. Communication signals received by the mobile device 700 may also be stored to the RAM 718.

The microprocessor 728, in addition to its operating system functions, enables execution of software applications on the mobile device 700. A predetermined set of software applications that control basic device operations, such as a voice communications module 730A and a data communications module 730B, may be installed on the mobile device 700 during manufacture. In addition, a personal information manager (PIM) application module 730C may also be installed on the mobile device 700 during manufacture. The PIM application is in some embodiments capable of organizing and managing data items, such as e-mail, calendar events, voice mails, appointments, and task items. The PIM application is also in some embodiments capable of sending and receiving data items via a wireless network 710. In some embodiments, the data items managed by the PIM application are seamlessly integrated, synchronized and updated via the wireless network 710 with the device user's corresponding data items stored or associated with a host computer system.

In addition, a software application to perform a out of range determination function 730D may be installed. The out of range determination function 730D may implement any of the methods described herein for determining if the mobile device is out of range of a position broadcast system, the position broadcast system comprising a plurality of transmitters that each broadcast signals containing position information for the respective transmitter.

As well, additional software modules, illustrated as another software module 730N, may be installed during manufacture.

Communication functions, including data and voice communications, are performed through the communication subsystem 770, and possibly through the short-range communications subsystem 702. The communication subsystem 770 includes a receiver 750, a transmitter 752 and one or more antennas, illustrated as a receive antenna 754 and a transmit antenna 756. In addition, the communication subsystem 770 also includes a processing module, such as a digital signal processor (DSP) 758, and local oscillators (LOs) 760. The communication subsystem also includes a GPS receiver 740 that receives signals from GPS satellites 742 through an antenna 744. The specific design and implementation of the communication subsystem 770 is dependent upon the communication network in which the mobile device 700 is intended to operate. For example, the communication subsystem 770 of the mobile device 700 may be designed to operate with the Mobitex™, DataTAC™ or General Packet Radio Service (GPRS) mobile data communication networks and also designed to operate with any of a variety of voice communication networks, such as Advanced Mobile Phone Service (AMPS), Time Division Multiple Access (TDMA), Code Division Multiple Access (CDMA), Personal Communications Service (PCS), Global System for Mobile Communications (GSM), etc. Other types of data and voice networks, both separate and integrated, may also be utilized with the mobile device 700.

Network access requirements vary depending upon the type of communication system. For example, in the Mobitex™ and DataTAC™ networks, mobile devices are registered on the network using a unique Personal Identification Number (PIN) associated with each device. In GPRS networks, however, network access is associated with a subscriber or user of a device. A GPRS device therefore requires a subscriber identity module, commonly referred to as a Subscriber Identity Module (SIM) card, in order to operate on a GPRS network.

When required network registration or activation procedures have been completed, the mobile device 700 may send and receive communication signals over the communication network 710. Signals received from the communication network 710 by the receive antenna 754 are routed to the receiver 750, which provides for signal amplification, frequency down conversion, filtering, channel selection, etc., and may also provide analog to digital conversion. Analog-to-digital conversion of the received signal allows the DSP 758 to perform more complex communication functions, such as demodulation and decoding. In a similar manner, signals to be transmitted to the network 710 are processed (e.g., modulated and encoded) by the DSP 758 and are then provided to the transmitter 752 for digital to analog conversion, frequency up conversion, filtering, amplification and transmission to the communication network 710 (or networks) via the transmit antenna 756.

In addition to processing communication signals, the DSP 758 provides for control of the receiver 750, the GPS receiver 740 and the transmitter 752. For example, gains applied to communication signals in the receiver 750 and the transmitter 752 may be adaptively controlled through automatic gain control algorithms implemented in the DSP 958.

In a data communication mode, a received signal, such as a text message or web page download, is processed by the communication subsystem 770 and is input to the microprocessor 728. The received signal is then further processed by the microprocessor 728 for an output to the display 726, or alternatively to some other auxiliary I/O devices 706. A device user may also compose data items, such as e-mail messages, using the keyboard 714 and/or some other auxiliary I/O device 706, such as a touchpad, a rocker switch, a thumb-wheel, or some other type of input device. The composed data items may then be transmitted over the communication network 710 via the communication subsystem 770.

In a voice communication mode, overall operation of the device is substantially similar to the data communication mode, except that received signals are output to a speaker 711, and signals for transmission are generated by a microphone 712. Alternative voice or audio I/O subsystems, such as a voice message recording subsystem, may also be implemented on the device 700. In addition, the display 726 may also be utilized in voice communication mode, for example, to display the identity of a calling party, the duration of a voice call, or other voice call related information.

The short-range communications subsystem 702 enables communication between the mobile device 700 and other proximate systems or devices, which need not necessarily be similar devices. For example, the short-range communications subsystem may include an infrared device and associated circuits and components, or a Bluetooth™ communication module to provide for communication with similarly-enabled systems and devices.

What has been described is merely illustrative of the application of the principles of methods, modules and devices described herein. Other arrangements and methods can be implemented by those skilled in the art without departing from the spirit and scope of the embodiments.

The invention claimed is:

1. A method, in a mobile device configured to obtain position information from a position broadcast system, the position broadcast system comprising a plurality of transmitters that each broadcast a respective signal containing position information for the respective transmitter, the method comprising:
    measuring signal strengths of signals from each of a plurality of the transmitters of the position broadcast system;
    determining that the mobile device is out of range of the position broadcast system if the measured signal strengths satisfy an out of range criterion;
    if the mobile device is determined to be out of range, operating the mobile device according to an out of range profile for conservation of power; and
    if the mobile device is not determined to be out of range, attempting to lock on to a position using the position broadcast system,
    wherein the out of range criterion differs from criteria used to determine whether or not it is possible to lock on to a position, and wherein determining that the mobile device is out of range based on the out of range criterion comprises at least one of:
    determining that fewer than a predetermined number of the measured signal strengths are above a threshold value;
    determining that a sum of highest measured signal strengths of signals from each of a predetermined number of transmitters is below a threshold value; and
    determining that the signal strength of fewer than a predetermined number of visible transmitters is above a threshold value; and
    wherein operating the mobile device according to an out of range profile for conservation of power comprises turning off a position broadcast receiver in the mobile device.

2. The method of claim 1, wherein the position broadcast system is a Global Positioning System (GPS), and measuring the signal strengths comprises measuring signal strengths of a plurality of signals from satellites of the Global Positioning System (GPS).

3. The method of claim 1, further comprising attempting to obtain position information from the position broadcast system after a predetermined period of time after the mobile device is determined to be out of range has expired.

4. The method of claim 1, wherein measuring the signal strengths comprises averaging a plurality of measurements for each signal.

5. The method of claim 1, further comprising indicating with a user interface that the mobile device is out of range if the mobile device is determined to be out of range.

6. A mobile device comprising:
    a receiver for measuring signal strengths of signals from each of a plurality of transmitters of a position broadcast system;
    an out of range determination module configured to determine that the mobile device is out of range of the position broadcast system if the measured signal strengths satisfy at least one out of range criterion; and
    a processor configured to:
    if the mobile device is determined to be out of range, operate the mobile device according to an out of range profile for conservation of power; and
    if the mobile device is not determined to be out of range, attempt to lock on to a position using the position broadcast system;
    wherein the out of range determination module is configured to perform at least one of the method steps comprising:
    determining that fewer than a predetermined number of the measured signal strengths are above a threshold value;
    determining that a sum of highest measured signal strengths of signals from each of a predetermined number of transmitters is below a threshold value; and
    determining that the signal strength of fewer than a predetermined number of visible transmitters is above a threshold value,
    wherein determining that the mobile device is out of range based on the at least one out of range criterion uses criteria that differ from criteria used to determine whether or not it is possible to lock on to a position; and
    wherein operating the mobile device according to an out of range profile for conservation of power comprises turning off a position broadcast receiver in the mobile device.

7. The mobile device of claim 6, wherein the plurality of transmitters are satellites.

8. The mobile device of claim 6, wherein the receiver is a Global Positioning System (GPS) receiver.

9. The mobile device of claim 8, wherein the out of range determination module is implemented by firmware for controlling a GPS chipset.

10. The mobile device of claim 8, wherein the out of range determination module is implemented by a GPS chipset.

11. One or more non-transitory computer readable media having computer readable instructions stored thereon that when executed implement a method for determining if a mobile device is out of range of a position broadcast system, the position broadcast system comprising a plurality of transmitters that each broadcast signals containing position information for the respective transmitter, the method comprising:
    measuring signal strengths of signals from each of a plurality of the transmitters of the position broadcast system;
    determining that the mobile device is out of range of the position broadcast system if the measured signal strengths satisfy an out of range criterion;
    if the mobile device is determined to be out of range, operating the mobile device according to an out of range profile for conservation of power; and
    if the mobile device is not determined to be out of range, attempting to lock on to a position using the position broadcast system,
    wherein the out of range criterion differs from criteria used to determine whether or not it is possible to lock on to a position, and wherein determining that the mobile device is out of range based on the out of range criterion comprises at least one of:
    determining that fewer than a predetermined number of the measured signal strengths are above a threshold value;
    determining that a sum of highest measured signal strengths of signals from each of a predetermined number of transmitters is below a threshold value; and
    determining that the signal strength of fewer than a predetermined number of visible transmitters is above a threshold value; and wherein operating the mobile device according to an out of range profile for conservation of power comprises turning off a position broadcast receiver in the mobile device.

12. The method of claim 1, wherein operating the mobile device according to an out of range profile further comprises at least one of instructing all applications on the mobile device that rely on location information to use the last position received, and displaying an indication on a user interface of the mobile device that the device is out of range.

13. The method of claim 4, wherein the plurality of measurements for each signal are taken over a predetermined period of time.

14. The method of claim 1, wherein operating the mobile device according to an out of range profile further comprises presenting an option on a user interface to attempt to obtain position information, the option being presented when a predetermined period of time after the mobile device is determined to be out of range has expired.

\* \* \* \* \*